(12) United States Patent
Phan

(10) Patent No.: US 7,091,986 B2
(45) Date of Patent: *Aug. 15, 2006

(54) DYNAMIC PIXEL RESOLUTION, BRIGHTNESS AND CONTRAST FOR DISPLAYS USING SPATIAL ELEMENTS

(76) Inventor: Gia Chuong Phan, Park Avenue, Block 7, Flat 3A, 18 Hoiting Road, Kowloon (HK)

( * ) Notice: Subject to any disclaimer, the term of this patent is extended or adjusted under 35 U.S.C. 154(b) by 241 days.

This patent is subject to a terminal disclaimer.

(21) Appl. No.: 10/727,545

(22) Filed: Dec. 5, 2003

(65) Prior Publication Data
US 2004/0150651 A1    Aug. 5, 2004

Related U.S. Application Data

(63) Continuation-in-part of application No. 10/339,491, filed on Jan. 10, 2003, and a continuation-in-part of application No. 09/151,287, filed on Sep. 11, 1998, now Pat. No. 6,661,429.

(30) Foreign Application Priority Data
Sep. 13, 1997    (DE) .................................. 197 41 132

(51) Int. Cl.
G09G 5/02    (2006.01)
(52) U.S. Cl. .................... 345/589; 345/613; 345/694
(58) Field of Classification Search ............... 345/3.3, 345/589, 613, 694, 695, 696, 698, FOR. 168, 345/171; 348/146; 282/299, 300
See application file for complete search history.

U.S. PATENT DOCUMENTS 5,559,529 A * 9/1996 Maher .................. 345/613
6,661,429 B1 * 12/2003 Phan .................... 345/694

FOREIGN PATENT DOCUMENTS

DE    3606404 A1    9/1986
EP    0 637 009 A2    2/1995

* cited by examiner

Primary Examiner—Kee M. Tung
Assistant Examiner—J. F. Cunningham
(74) Attorney, Agent, or Firm—Birch, Stewart, Kolasch & Birch, LLP

(57) ABSTRACT

A display including static pixels and dots (individual element) arranged in a predetermined manner. Dynamic pixels are generated dynamically, comprising dots selected from at least two adjacent static pixels. Overlapping of dynamic pixels on the static pixels creates an enhanced resolution at the human's eyes. A weighted dot rendering method can be performed for all static and dynamic pixels of a low resolution inventive display to be displayed in an additive way with the viewing perception of an enhanced higher resolution display. By adjusting the light emitting area and space of dots in a static pixel, maximum optimized brightness in a white balance equilibrium with good contrast can be obtained in finding an optimal ratio between the non light emitting area (black mask or black barrier ribs) and the light emitting area.

34 Claims, 15 Drawing Sheets

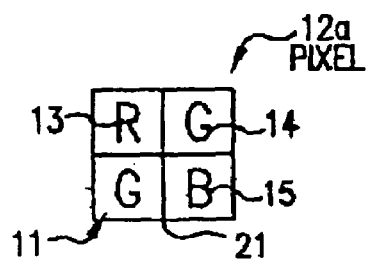 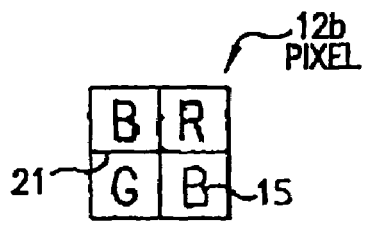 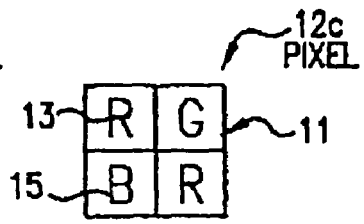
FIG.1a  FIG.1b  FIG.1c
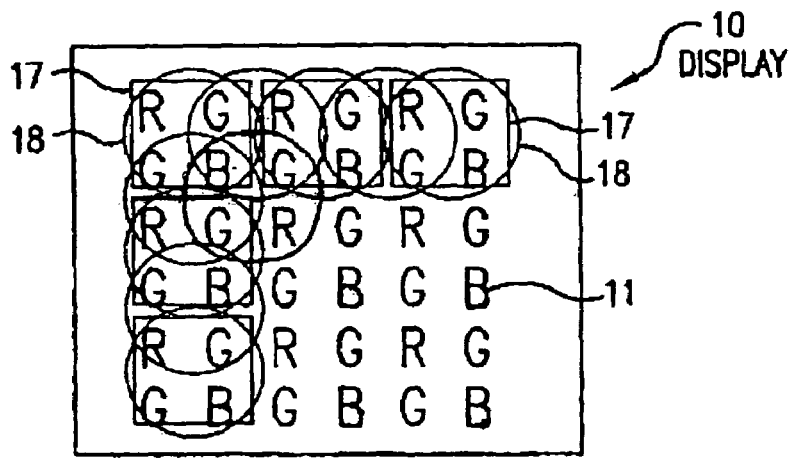
FIG.2a
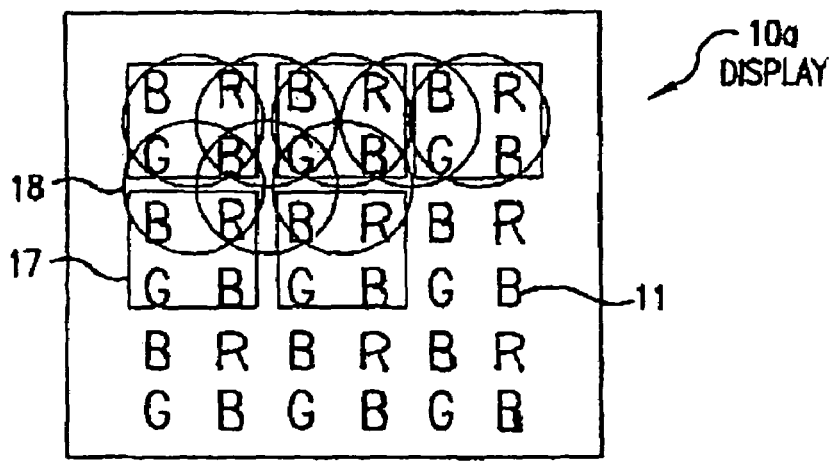
FIG.2b

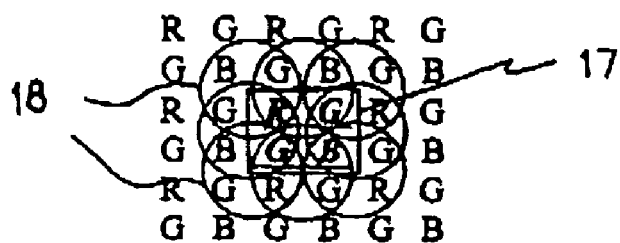
FIG. 9
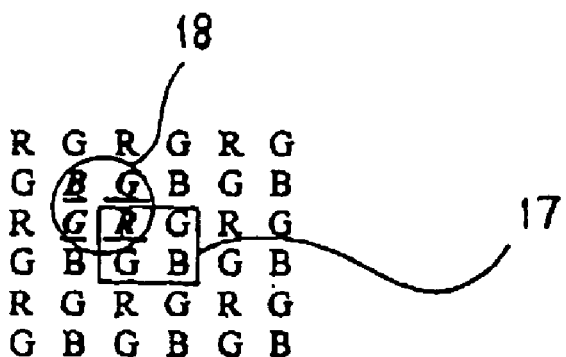
FIG. 9.1
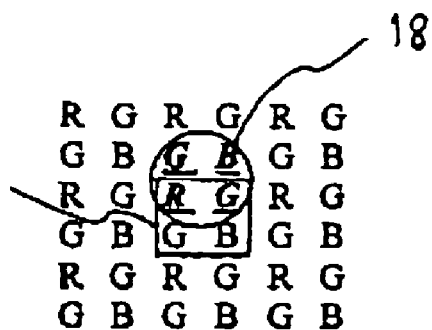
FIG. 9.2
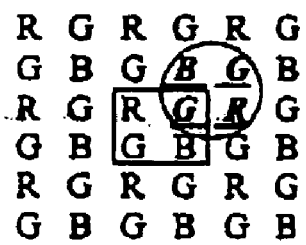
FIG. 9.3
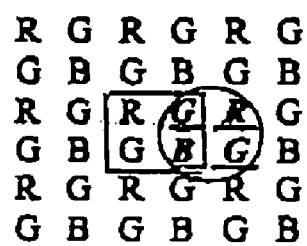
FIG. 9.4
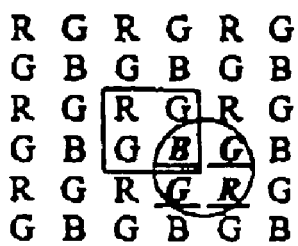
FIG. 9.5
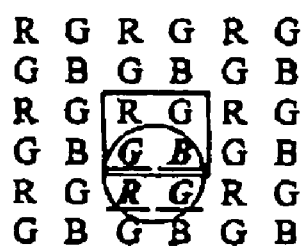
FIG. 9.6

Quad pixels Display with 480 x 640 static pixels resolution and 959 x 1279 inventive dynamic pixels resolution FIG. 13a  Conventional RGB stripes display 9 x 5 pixels FIG. 13aa  Invented display with dynamic resolution 9 x 5 pixels
Frame 1

$$G' = G'' = \frac{G}{2}$$

|   | 1 | 2 | 3 | 4 | 5 | 6 | 7 | 8 | 9 |   |
|---|---|---|---|---|---|---|---|---|---|---|
|   | RGB | RGB | RGB | RGB | RGB | RGB | RGB | RGB | RGB | 1 |
|   | RGB | RGB | RGB | RGB | RGB | RGB | RGB | RGB | RGB | 2 |
|   | RGB | RGB | RGB | RGB | RGB | RGB | RGB | RGB | RGB | 3 |
|   | RGB | RGB | RGB | RGB | RGB | RGB | RGB | RGB | RGB | 4 |
|   | RGB | RGB | RGB | RGB | RGB | RGB | RGB | RGB | RGB | 5 |

FIG. 13b   Conventional RGB stripes display 9 x 5 pixels

|   | 1 | 2 | 3 | 4 | 5 | 6 | 7 | 8 | 9 | 10 |   |
|---|---|---|---|---|---|---|---|---|---|---|---|
|   | R | G" | R | G" | R | G" | R | G" | R | G" | 1 |
|   | G' | B | G' | B | G' | B | G' | B | G' | B | 2 |
|   | R | G" | R | G" | R | G" | R | G" | R | G" | 3 |
|   | G' | B | G' | B | G' | B | G' | B | G' | B | 4 |
|   | R | G" | R | G" | R | G" | R | G" | R | G" | 5 |
|   | G' | B | G' | B | G' | B | G' | B | G' | B | 6 |

FIG. 13bb   Invented display with dynamic resolution 9 x 5 pixels
Frame 2

$$G' = G'' = \frac{G}{2}$$

FIG. 13c  Conventional RGB stripes display 9 x 5 pixels

FIG. 13cc  Invented display with dynamic resolution 9 x 5 pixels
Frame 3

$$G' = G'' = \frac{G}{2}$$

|   | 1 | 2 | 3 | 4 | 5 | 6 | 7 | 8 | 9 |   |
|---|---|---|---|---|---|---|---|---|---|---|
|   | RGB | RGB | RGB | RGB | RGB | RGB | RGB | RGB | RGB | 1 |
|   | RGB | RGB | RGB | RGB | RGB | RGB | RGB | RGB | RGB | 2 |
|   | RGB | RGB | RGB | RGB | RGB | RGB | RGB | RGB | RGB | 3 |
|   | RGB | RGB | RGB | RGB | RGB | RGB | RGB | RGB | RGB | 4 |
|   | RGB | RGB | RGB | RGB | RGB | RGB | RGB | RGB | RGB | 5 |

FIG. 13d  Conventional RGB stripes display 9 x 5 pixels

|   | 1 | 2 | 3 | 4 | 5 | 6 | 7 | 8 | 9 | 10 |   |
|---|---|---|---|---|---|---|---|---|---|---|---|
|   | R | G" | R | G" | R | G" | R | G" | R | G" | 1 |
|   | G' | B | G' | B | G' | B | G' | B | G' | B | 2 |
|   | R | G" | R | G" | R | G" | R | G" | R | G" | 3 |
|   | G' | B | G' | B | G' | B | G' | B | G' | B | 4 |
|   | R | G" | R | G" | R | G" | R | G" | R | G" | 5 |
|   | G' | B | G' | B | G' | B | G' | B | G' | B | 6 |

FIG. 13dd  Invented display with dynamic resolution 9 x 5 pixels
Frame 4

$$G' = G'' = \frac{G}{2}$$

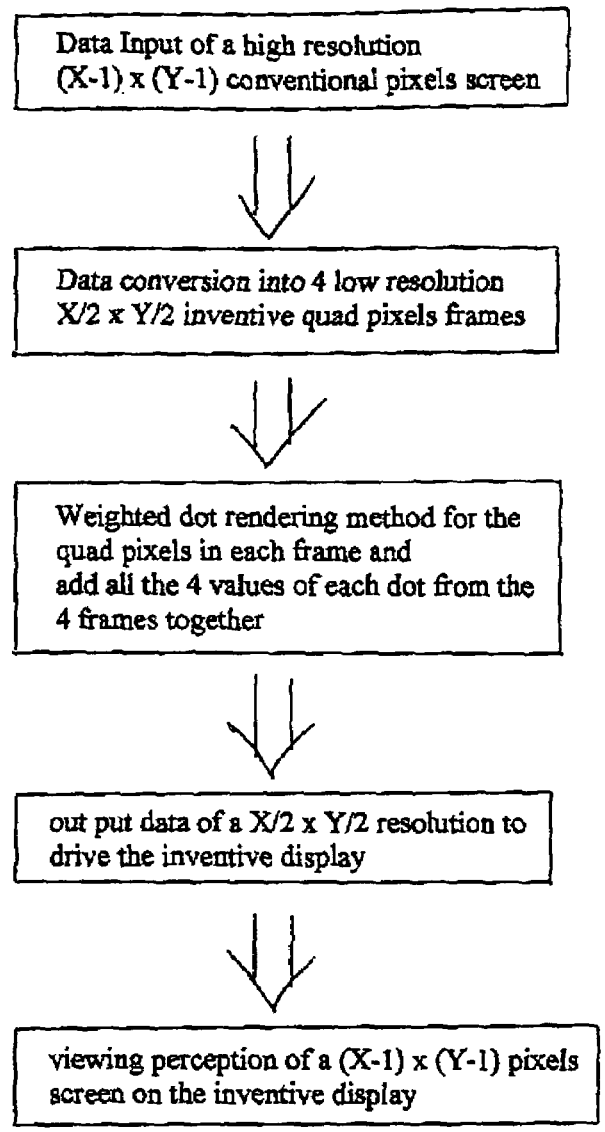
FIG. 13 e  Principle of weighted dot rendering method to display a high resolution (X-1) x (Y-1) pixels screen on a low resolution X/2 x Y/2 quad pixel screen of the inventive display with the perception of viewing a high resolution (X-1) x (Y-1) screen.

DYNAMIC PIXEL RESOLUTION, BRIGHTNESS AND CONTRAST FOR DISPLAYS USING SPATIAL ELEMENTS

CROSS-REFERENCE TO RELATED APPLICATIONS

This is a continuation-in-part of U.S. patent application Ser. No. 10/339,491, filed on Jan. 10, 2003; U.S. patent application Ser. No. 09/151,287, filed Sep. 11, 1998; and claims priority under 35 U.S.C. §119 and 37 C.F.R. §1.55(a) of German Application No. 197 41 132.0, filed Sep. 13, 1997.

BACKGROUND OF THE INVENTION

1. Field of the Invention

The invention relates to a display comprising pixels and dots, including but not limited to the following display technologies: Cathode Ray Tube (CRT), Field Emission Display (FED), Vacuum Florescent Display (VFD), Plasma Display Panel (PDP), Liquid Crystal Display (LCD), Light Emitting Diode (LED), Organic Light Emitting Diode (OLED), Polymer Light Emitting Diode (PLED), Electroluminescence (EL), Electronic inks, Surface Emitting Display (SED), Digital Light Processing (DLP), Electro-mechanics, Phototronics, Biotronics and any light sources known or invented in the future as well as a method for controlling the (said) display.

It is another objective of the present invention to adjust the light emitting area and space of different individual elements in a pixel contoured by black mask or barrier ribs of the same structure to optimize the luminance and the brightness of a display.

It is further objective of the present invention to provide a method to display high resolution video source like HDTV in a dynamic high resolution enhanced display of the present invention. Further to provide a method to display upscaling low resolution video source like SDTV, to be displayed on a dynamic high resolution enhanced display of the present invention.

It is another objective of the present invention to provide a dual mode (HDTV video mode and Computer text mode) in an HDTV enable WebTV for internet browsing as well as for watching HDTV quality video.

It is another objective of the present invention to perform a weighted dot rendering method for the generated dynamic pixels to display a picture, text, or video frame.

It is another objective of the present invention to present an automatic or manual colors re-calibrating method for compensating the shifting of colors due to the different decreases in light intensity over the time from the characteristic of different red, green, and blue light sources.

The invention relates to a display comprising pixels and dots, as well as a method of controlling said display.

2. Description of Background Art

In known display of the kind used in video, film and computer technology, so-called pixels are arranged along horizontally and/or vertically extending lines. The pixels generally consist of so-called dots representing the three basic colours red, green and blue. Dots are sources of luminous radiation the light of which is mixed to generate luminous mixed colours in a process referred to as additive mixing.

In computer monitors and television receivers the display is divided into a plurality of pixels arranged on a fixed grid or raster. Each pixel is controlled individually, with the pixels addressed from left to right and from the top to the bottom, for instance, as is customary practice for CRT screens.

EP 0 637 009 A2 discloses a method of controlling active LCD displays in which the dots are arranged in a mutually offset pattern to form a delta shape, with the dots of each colour group vertically interconnected by a control line. Horizontal control is effected pixelwise, meaning that the three dots of each RGB pixel are addressed at the same time. Further, each dot comprises a memory element and a switching element, whereby RGB data can be transmitted using synchronizing information, as is the case in conventional monitors, for example.

DE 36 06 404 A1 discloses a method of generating picture elements on a colour display, as well as a colour display. The method uses a light gate array of which the light gates are addressable individually by means of control circuitry in such a manner that the desired colour intensity is obtained by controlling the transmission properties of the respective light gate. Light sources are disposed behind the light gate to provide at least two primary colours and are switched in alternating light cycles at a repetition rate of at least 25 Hz, with the light gates being controlled synchronously therewith. Because of the inertia of the human eye, it is possible for a gate to display the desired colour.

One drawback of this kind of display is that the number of pixels is limited by the fixed grid, which limits the resolution and the picture sharpness as well. The finer the grid, the higher the resolution. The fineness of the grid itself is limited by manufacturing technology, however, because the cathode ray tubes that are used for the displays comprise so-called shadow masks having holes therein which cannot be reduced to whatever size unless one puts up with considerable expenditures.

Likewise, in LCD displays, the integration of a great number of thin film transistors (TFT) is extremely expensive and very prone to produce major amounts of rejects. In Plasma (PDP) or in FED displays, the technical and economical manufactured size of a RGB pixel is physically limited by the mass production technology itself and further reduction of the RGB pixel size for higher resolution cannot be achieved without huge manufacturing equipment cost and over proportional scraps which are economically not viable.

In LED displays, the placement of the LEDs is complicated and expensive as their space demand is predetermined by their shape.

SUMMARY AND OBJECTS OF THE INVENTION

It is the object of the present invention to provide a display of the aforesaid kind which has a higher optical resolution for a given grid.

The above object is achieved by a variable generation of pixels from existing dots, said pixels forming a dynamically generated logical unit by grouping adjacent dots so that adjacent pixels are physically superimposed. In the process, said generation of the dynamic pixels takes place at a rate high enough not to be perceivable by the human eye.

A dynamic pixel is supposed to consist of at least as many dots that it comprises all the basic colours given by those dots.

It is another object of the present invention to provide a method which enables an enhanced resolution to be obtained for dot-addressed displays.

This object is achieved specifically by a dynamic generation of pixels wherein a one-pixel logical unit is formed by grouping adjacent dots, with adjacent pixels being physically superimposed and the dynamic pixels being generated by sequential addressing at a rate such that said generation is not perceivable by the human eye.

When selected to be assembled into a group, the dots are chosen so that adjacent pixels overlap partly only. As a result, another dynamic pixel will be formed between existing, normally static pixels. The pixels are combined in a manner such as to comprise all basic colours provided by the dots.

The dynamic quad pixels comprising common red, green and blue dots overlap each other on a lower resolution screen to give a perception of the higher resolution display. A weighted dot rendering method for all the static and dynamic-generated quad pixels can be adopted to generate a rendered low resolution data screen for driving the inventive display with the perception of viewing a 100% equipped conventional 4 times higher than the low resolution display.

In order to compensate the shifting of colors due to the different decreases in light intensity over the time from the characteristic of the primary red, green, and blue light sources, it is necessary to generate an automatic or manual colors re-calibrating method for compensating this color shifting defect.

BRIEF DESCRIPTION OF THE DRAWINGS

Further advantageous measures are described in the dependent claims. The invention is shown in the attached drawing and is described hereinafter in greater detail.

FIGS. 1a–c show various forms of arranging four dots within a square pixel;

FIGS. 2a–b show various embodiments of a display with square pixels, with the well-known static pixels being shown within squares and the dynamic pixels of the invention within circles;

FIGS. 8.1–8.12 show twelve dynamic delta pixels sharing common dots (individual elements) with a static delta pixel;

FIG. 9 shows a quad pixels display;

FIGS. 9.1–9.8 show eight dynamic quad pixels sharing common dots (individual elements) with a static quad pixel;

FIGS. 13a–13d show the pixels position of a conventional RGB stripes display of the resolution 9×5, and FIGS. 13aa, 13bb, 13 cc, and 13dd show a corresponding quad pixels display of the present invention with a dynamic resolution of 9×5 pixels (static resolution 5×3 pixels) where G' =G"=G/2 value of the corresponding RGB static pixel in the conventional display.

FIG. 13e shows the principle of a weighted dot rendering method to convert a (X−1)×(Y−1) resolution of a conventional RGB stripe pixels display into a low resolution X/2×Y/2 resolution of the present inventive quad pixels display for a viewing perception of a high resolution (X−1)× (Y−1) image on the inventive display.

DETAILED DESCRIPTION OF THE PREFERRED EMBODIMENTS

Figure 3A:
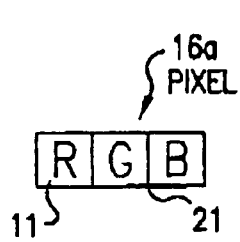
FIGS. 3a–e show various forms of a pixel comprising the three basic colour dots red, green and blue.
Figure 3B:
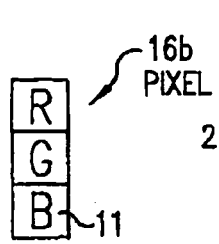
Figure 3C:
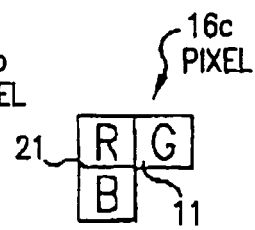
Figure 3D:
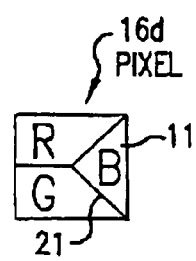

As shown in FIGS. 1a to 1c, pixels 12a, 12b and 12c have a square shape. Pixels 12a, 12b and 12c comprise regularly disposed dots 11 radiating the basic colours red (red dot 13), green (green dot 14) and blue (blue dot 15).

In FIGS. 1b and 1c, we observe different dots arrangement in a quad pixel. Preferably, each dot 11 is surrounded by a black mask or black barrier ribs 21 to obtain a higher contrast between the dynamic pixels 18. The precise arrangement of the various colour dots 13, 14, 15 is not critical; care should be taken, however, that the arrangement of the different dots 13, 14, and 15 should be identical in each static pixel 17 within a display 10.

FIGS. 2a and 2b show displays 10 and 10a having square static pixels 17. Static pixel 17 corresponds to a well known grid pattern or raster of display 10 or 10a. The dynamic pixels 18 shown in a circular form represent the inventive configuration of display 10 or 10a. Each dynamic pixel 18 comprises three dots 13, 14 and 15 representing the basic colours, as does each static pixel 17.

In contrast to static pixels 17, the dynamic pixels 17 overlap; they should not overly each other completely, however. High-frequency addressing of the dynamic pixels 18 will cause the human eye to be tricked into perceiving a more exact representation of the displayed picture, preferable at a rate of 100 Hz or higher.

In a display comprising rectangular or square pixels 12a, 12b, 12c, the resolution is increased by:

$$P=(x-1)*y+(2x-1)*(y-1)$$

pixels, with x being the number of horizontal pixels and y the number of vertical pixels.

In the displays of FIGS. 2a and 2b, this value would be:

$$P=(3-1)*3+(2*3-1)*(3-1)=6+10=16$$

As a result, this display has a resolution of 25=16+9 instead of 9 points.

FIGS. 3a to 3e show various forms of pixels 16a, 16b, 16c and 16d each comprising three dots 11 for generating the three basic colours. Dots 11 are separated by masks 21 to obtain sharp and well-defined contours.

The dynamic pixels 18 should preferably be formed to comprise the same number of dots 11. The spatial arrangement of the different colour dots 13, 14, 15 is not critical. Pixels comprising only two basic colours in the form of dots, for example, would suffice for a less than full colour display of the kind shown in FIG. 1b.

Figure 4A:
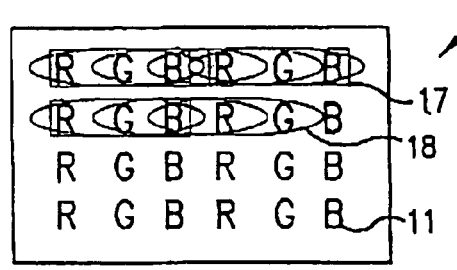
FIGS. 4a–b show various forms of a display featuring different pixel forms, with the well-known static pixels shown within squares and the dynamic pixels of the present invention shown in oval shapes.
Figure 3E:
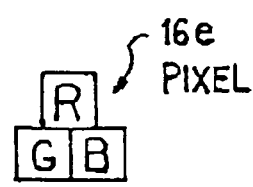
Figure 4B:
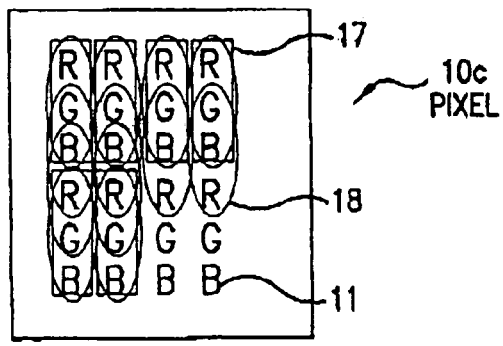

FIGS. 4a and 4b show displays 10b and 10c formed of pixels 16a and 16b, with the increase in resolution being less pronounced than in the case of the aforesaid square form.

Figure 5:
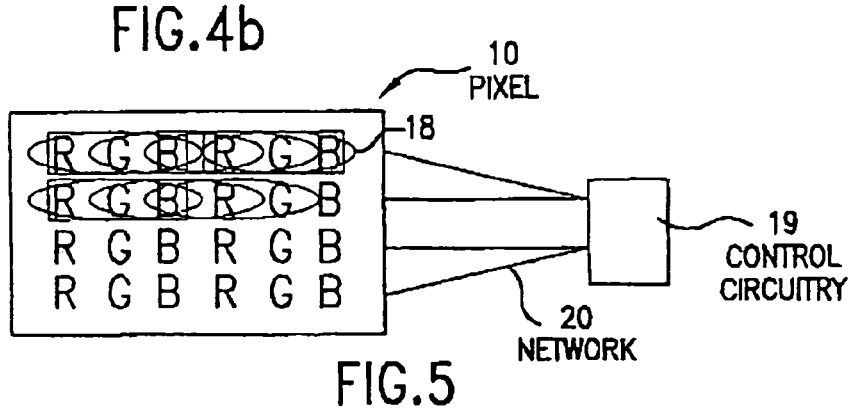
FIG. 5 shows a display addressed by control circuitry connected to the dot via a network.

FIG. 5 shows a display 10 connected to control circuitry 19 through a network 20. Control circuitry 19 allows known dot-addressed displays to be used, of which the resolution will be increased by the invention.

In the inventive displays, each dot has a receiver of its own (not shown) to convert digital information transmitted through network 20 into luminous intensity levels for dots 11.

Network 20 preferably is an optical fiber network. Control circuitry 19 combines adjacent dots 11 to form a dynamic pixel 18 in order to then address these as a logical unit. Addressing involves high-frequency repetition, preferably at a rate of minimum 100 Hz for passive driving display.

The inventive display can be used also for interlaced signals to combine the picture (frame) from even and odd fields 24, with odd field 24 composed of odd-numbered lines 22 and even field 24 of even-numbered lines 23.

Figure 6:
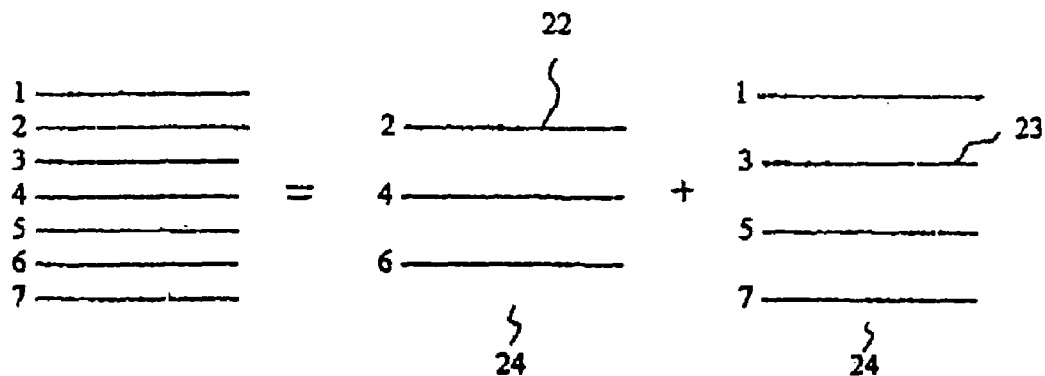
FIG. 6 shows the interlaced signal sequence in the generation of a frame from two fields.
Figure 7:
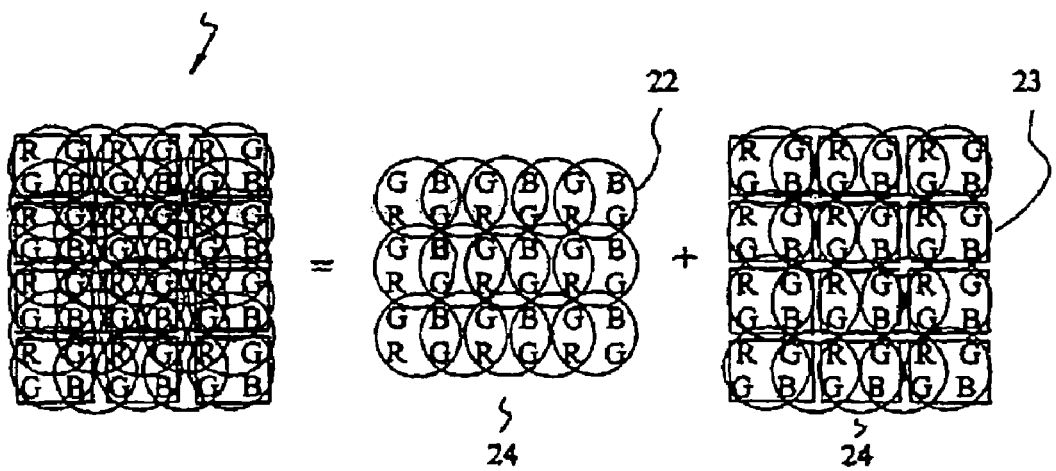
FIG. 7 shows the interlaced signal sequence in the generation of the inventive dynamic pixels.

The inertia of the human eye causes a picture to form which is composed of two fields 24. FIG. 6 shows the theoretical and FIG. 7 the inventive composition using dynamic pixels 18. Other pixel shapes are contemplated.

Figure 8:
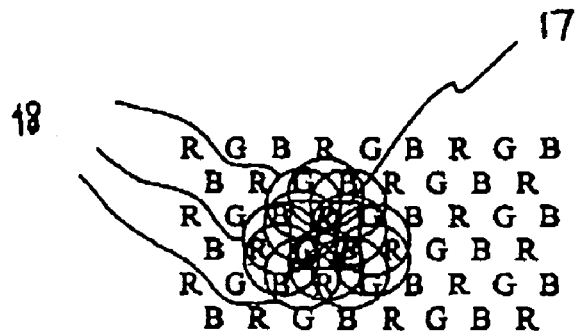
FIG. 8 shows a delta pixels display.

FIG. 8 shows a delta pixels display and wherein FIGS. 8.1 to 8.12 show twelve dynamic delta pixels 18 sharing common dots (individual elements) with a static delta pixel 17.

FIG. 9 shows a quad pixels display, wherein FIG. 9.1 to 9.8 show eight dynamic quad pixels 18 sharing common dots (individual elements) with a static quad pixel 17.

Figure 10A:
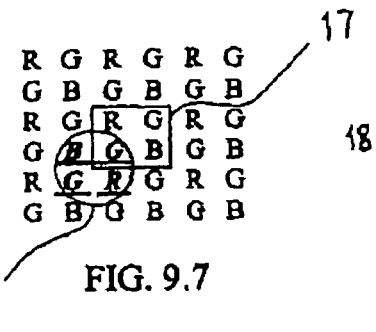
FIG. 10a shows a rectangle quad pixel where the crosspoint 33 is in the centre of the four dots (individual elements) of equal light emitting area and space, contoured by black mask or black barrier ribs with the same structure.
Figure 10A:
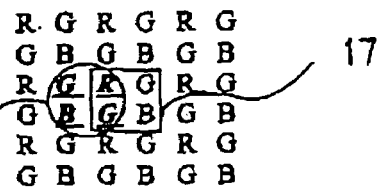
Figure 10A:
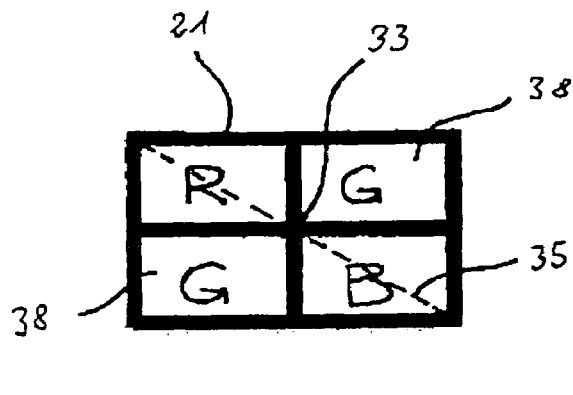

FIG. 10a shows a rectangle quad pixel where the crosspoint 33 is in the centre of the four dots (individual elements) of equal light emitting area and space, contoured by black mask or black barrier ribs 21 with the same structure.

Figure 10B:
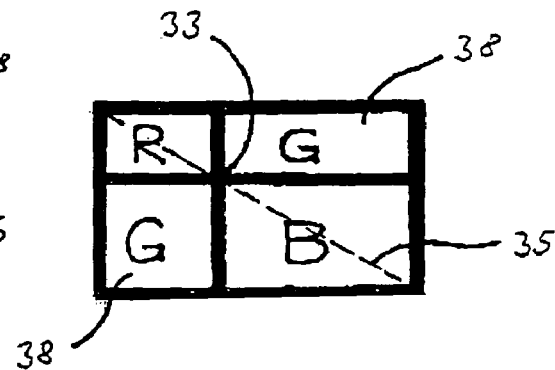
FIG. 10b shows a typical rectangle quad pixel where the crosspoint moving along the diagonal line forms two dots (individual elements) of equal light emitting area and space of green color (G)

FIG. 10b shows a typical rectangle quad pixel where the crosspoint 33 moving along the diagonal line 35 forms two dots (individual elements) of equal light emitting area and space 38 of green color (G).

Figure 11A:
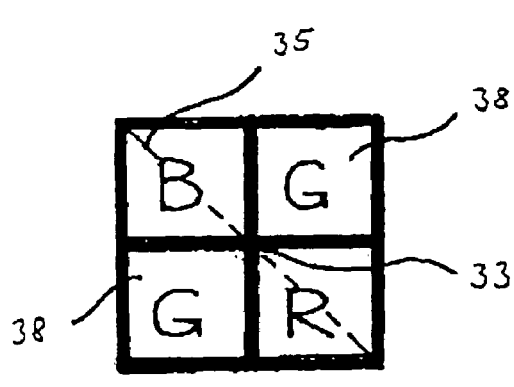
FIG. 11a shows a square quad pixel where the crosspoint is in the centre of the four dots (individual elements) of equal light emitting area and space, contoured by black mask or black barrier ribs with the same structure.

FIG. 11a shows a square quad pixel where the crosspoint 33 is in the centre of the four dots (individual elements) of equal light emitting area and space, contoured by black mask or black barrier ribs 21 with the same structure.

Figure 11B:
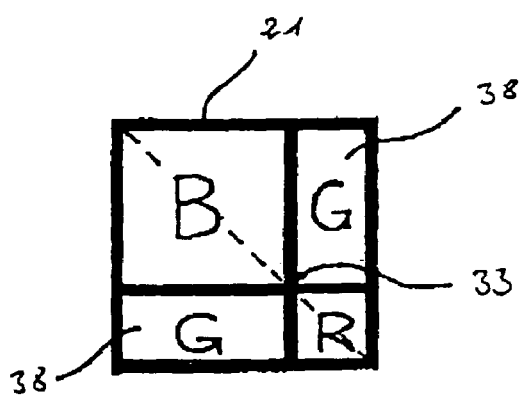
FIG. 11b shows a typical square quad pixel where the crosspoint moving along the diagonal line forms two dots (individual elements) of equal light emitting area and space of green color (G)

FIG. 11b shows a typical square quad pixel where the crosspoint 33 moving along the diagonal line 35 forms two dots (individual elements) of equal light emitting area and space 38 of green color (G).

Figure 12:
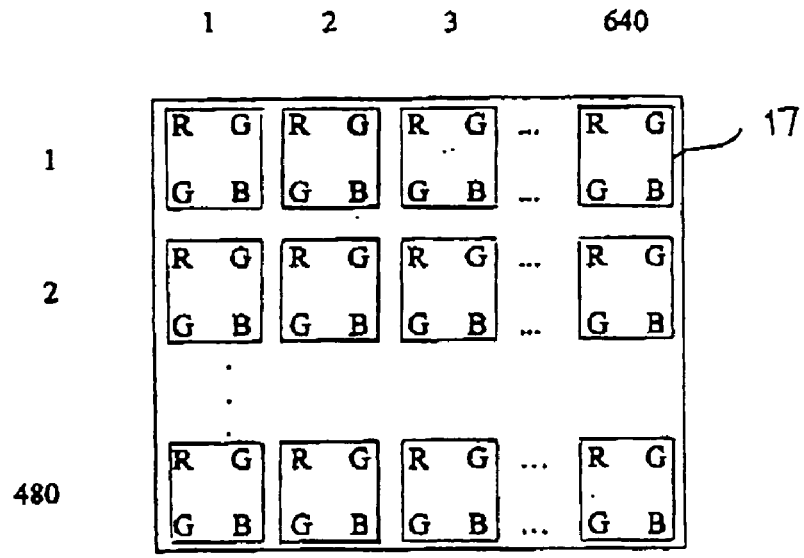
FIG. 12 shows a quad pixels display with a resolution of 480×640 static pixels.
Figure 12A:
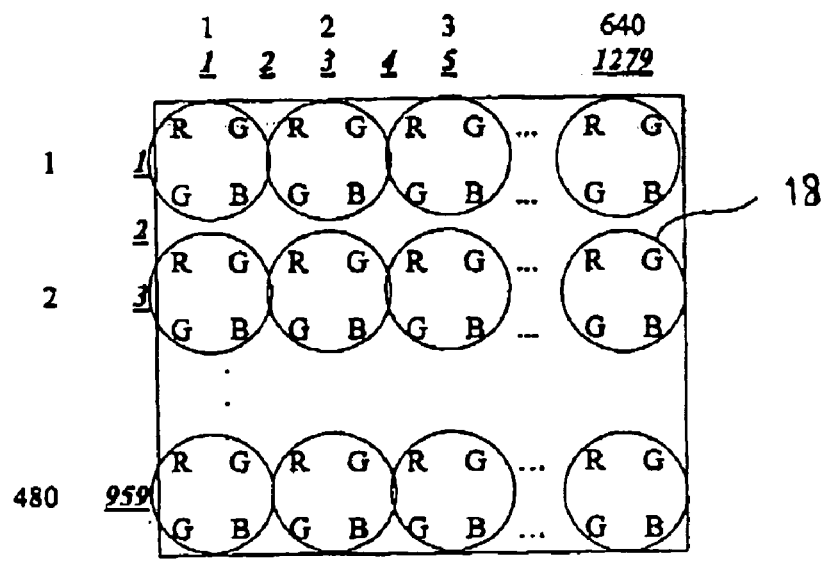
FIGS. 12a–12d show a sequence of four dynamic screen layers of 480×640 resolution each which are displayed and superimposed subsequently over a time frame in order to obtain an enhanced high resolution screen of 959×1279 dynamic pixels.
Figure 12B:
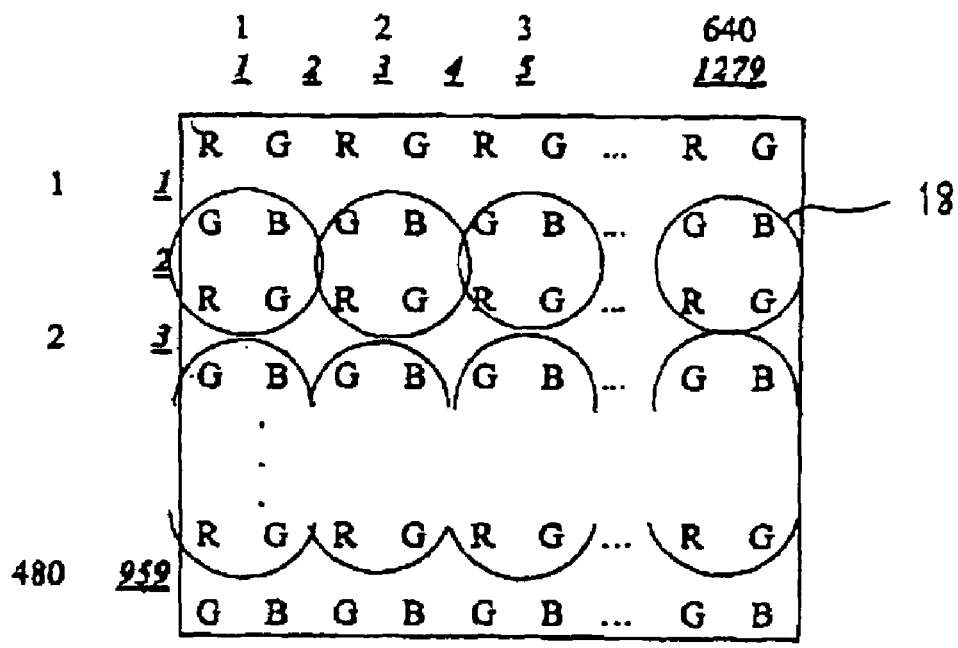
Figure 12C:
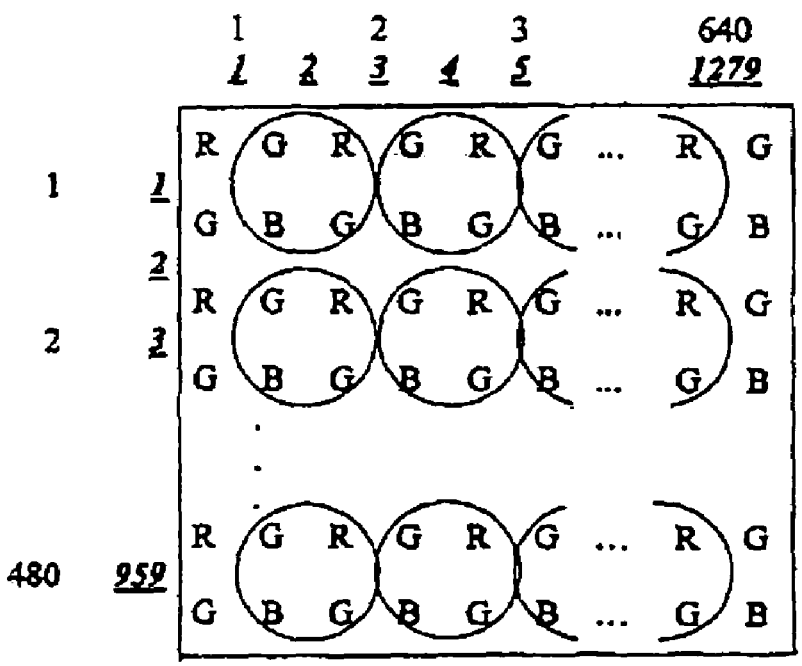
Figure 12D:
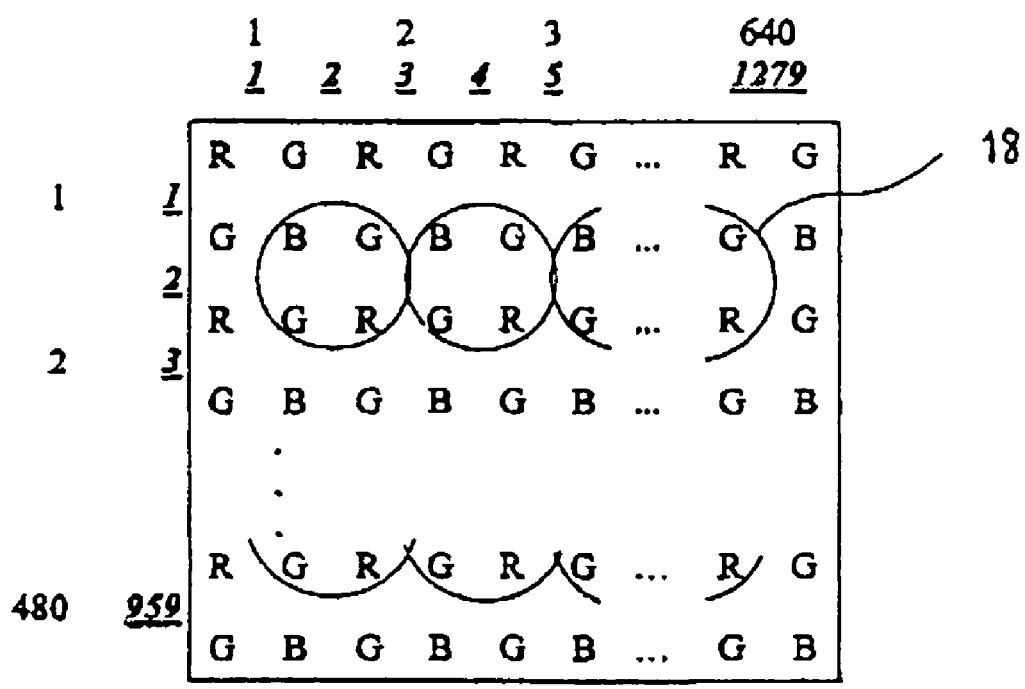

FIG. 12 shows a quad pixels display with a resolution of 480×640 static pixels 17 and wherein FIGS. 12a to 12d show a sequence of four dynamic screen layers of 480×640 resolution each which are displayed and superimposed subsequently over a time frame in order to obtain an enhanced high resolution screen of 959×1279 dynamic pixels 18.

FIGS. 13a, 13b, 13c, and 13d shows an example of a same conventional RGB stripes display with a resolution 9×5 pixels. FIGS. 13aa, 13bb, 13cc, and 13dd shows a corresponding quad pixels display of the present invention with a dynamic resolution of 9×5 pixels (static resolution 5×3 pixels) where G'=G"=G/2 value of the corresponding RGB static pixel in the conventional display. All the RGB values of the conventional display of a resolution 9×5 pixels can be then distributed into 4 frames of the inventive quad pixels display of a static resolution of 5×3 pixels.

The static pixel 17 of FIG. 13a corresponds to the dynamic pixel 18 of FIG. 13aa in frame 1. Other dynamic pixels in FIG. 13aa are corresponding to the static pixels in FIG. 13a according to their positions in the geometry of the matrix.

The static pixel 17 of FIG. 13b corresponds to the dynamic pixel 18 of FIG. 13bb in frame 2. Other dynamic pixels in FIG. 13bb are corresponding to the static pixels in FIG. 13b according to their positions in the geometry of the matrix.

The static pixel 17 of FIG. 13c corresponds to the dynamic pixel 18 of FIG. 13cc in frame 3. Other dynamic pixels in FIG. 13cc are corresponding to the static pixels in FIG. 13c according to their positions in the geometry of the matrix.

The static pixel 17 of FIG. 13d corresponds to the dynamic pixel 18 of FIG. 13dd in frame 4. Other dynamic pixels in FIG. 13dd are corresponding to the static pixels in FIG. 13d accordingly their positions in the geometry of the matrix.

The conventional RGB stripes display of the resolution 9×5 corresponds to the combination of 4 frames of lower resolution 5×3 of a quad pixels display of the present invention.

By doing a weighted dot rendering method for quad dynamic pixels of the present invention by attributing certain weight in percentage W (W=25% to 85%, typical 50%) to the numeric value of the selected main dot of a quad pixel and the rest 3 dots of the quad pixel will be attributed to a weight equal to (100%−W)/3. The rest of the energy of the selected main dot in the dynamic quad pixel is distributed equally to the rest 3 dots in the quad pixel in each low resolution frame, thus by numerically adding all the weighted values of each dot from the 4 low resolution frames together, we obtain overall 100% weight for each dot, provided that we use the same percentage W for all 4 frames, i.e. W1=W2=W3=W4=W where W1 is the weight of the selected main dots in percentage for the frame 1 . . . etc.

The selected main dots to perform a weighted dot rendering method for all dynamic pixels in frame one are the upper left dots of the dynamic quad pixels. In our example of FIG. 13aa, it is the R red dots.

The selected main dots to perform a weighted dot rendering method for all dynamic pixels in frame two are the upper left dots of the dynamic quad pixels. In our example of FIG. 13bb, it is the B blue dots.

The selected main dots to perform a weighted dot rendering method for all dynamic pixels in frame three are the upper left dots of the dynamic quad pixels. In our example of FIG. 13cc, it is the G" green dots.

The selected main dots to perform a weighted dot rendering method for all dynamic pixels in frame four are the upper left dots of the dynamic quad pixels. In our example of FIG. 13dd, it is the G' green dots.

By changing automatically or manually (on screen data input) the weight of the selected main dots in each frame differently, the leverage of a certain color can be obtained to re-calibrate the display for re-obtaining the white balance after color shifting due to the different decrease of light intensity of each primary color dot. In this case W1, W2, W3 and W4 may have different weights expressed in percentages and the numerical addition result of all weights for each dot for the 4 low resolution frames is not equal to 100%.

After doing the weighted dot rendering method for the selected main dots in each frame of, all values of each dots in each frame of the total 4 frames are added together to obtain a specific final value for R, G, B of the inventive display.

FIG. 13e shows the principle of a weighted dot rendering method to convert a (X−1)×(Y−1) resolution of a conventional RGB stripe pixels display into a low resolution X/2×Y/2 resolution of the present inventive quad pixels display for a viewing perception of a high resolution (X−1)×(Y−1) image on the inventive display.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display, comprising:
    a plurality of static pixel groups, each static pixel group of the plurality of static pixel groups comprising a plurality individual elements grouped in a predetermined manner similar or identical to other static pixel groups in the plurality of static pixel groups; and
    a plurality of dynamic pixel groups, at least one dynamic pixel group of the plurality of dynamic pixel groups comprises a plurality of individual elements selected from at least two adjacently situated pixel groups of the plurality of static pixel groups,
    wherein each one of the plurality of static pixel groups do not share individual elements from other individual static pixel groups, and
    wherein the dynamically-generated dynamic pixel groups are superimposed over the static pixel groups subsequently in a predetermined sequence and manner vertically and/or horizontally, thus enabling an enhanced resolution in a vertical and/or a horizontal direction for a given resolution to be obtained for a given resolution for individual element addressed displays.

2. The display according to claim 1, wherein each static pixel group of the plurality of static pixel groups includes individual elements having one of the colors red, green and blue.

3. The display according to claim 1, wherein each dynamic pixel group of the plurality of dynamic pixel groups includes individual elements having one of the colors red, green and blue.

4. The display according to claim 1, at least one static pixel group comprises a first group of a predetermined number of individual elements and at least one dynamic pixel group comprises a second group of the same predetermined number of individual elements, wherein the first and second groups include the same individual elements.

5. The display according to claim 1, wherein each dynamic pixel group of the plurality of dynamic pixel groups comprises individual elements constituting another dynamic pixel group of the plurality of dynamic pixel groups.

6. The display according to claim 1,
    wherein each static pixel group and each dynamic pixel group having four individual elements each (quad pixel group), and
    wherein the light emitting area and space of each quad pixel group as well as of its individual elements are preferable in the form of rectangle or square, and
    wherein the individual elements are aligned in straight lines in a matrix form.

7. The display according to claim 6, wherein the four individual elements in one pixel group having one of the colors red, green and blue, and
    wherein two of them having the same color.

8. The display according to claim 6, at least one static pixel group comprises a first group of four individual elements and at least one dynamic pixel group comprises a second group of the same number of individual elements, wherein the first and second groups include the same individual elements.

9. The display according to claim 6, wherein each dynamic pixel group of the plurality of dynamic pixel groups comprises individual elements constituting another dynamic pixel group of the plurality of dynamic pixel groups.

10. A display according to claim 6, wherein the light emitting area and space of each individual element in a given static quad pixel group can be determined in such a way that the cross point of the four individual elements moves along the diagonal line of the pixel group to form at least two same color individual elements of equal light emitting area and space.

11. A display according to claim 7, wherein the two individual elements of the same color share equally the data of the color data in a quad pixel group.

12. The display according to claim 1,
    wherein each static pixel group and each dynamic pixel group having three individual elements each, and
    wherein the individual elements are arranged in a mutually offset pattern, and
    wherein any three neighboring individual elements form an equilateral triangle (delta pixel group).

13. The display according to claim 12, wherein the three individual elements in one pixel group having one of the colors red, green and blue.

14. The display according to claim 12, at least one static pixel group comprises a first group of three individual elements and at least one dynamic pixel group comprises a second group of the same number of individual elements, wherein the first and second groups include the same individual elements.

15. The display according to claim 12, wherein each dynamic pixel group of the plurality of dynamic pixel groups comprises individual elements constituting another dynamic pixel group of the plurality of dynamic pixel groups.

16. The display according to claim 1, further comprising a control unit for controlling a luminous intensity of each individual element.

17. The display according to claim 1, wherein the light emitting area and space of each individual element in a static pixel group can be adjusted and optimized in order to obtain a maximum luminance in white balance equilibrium.

18. A display according to claim 1, wherein the determination of the light emitting area and space of each individual element in a static pixel group depends on the light emission performance of the individual element.

19. A display according to claim 1, wherein the non light emitting area and space (black mask or black barrier ribs) contouring each individual element has the same structure.

20. A display according to claim 1, wherein by adjusting the aperture ratio (the ratio of the light emitting area and space to the total display area and space or percentage of the effective display area in a display panel), optimized luminance and contrast can be obtained in finding an optimal ratio between the non light emitting area (black mask or black barrier ribs) and the light emitting area to an acceptable level for human eyes.

21. A method for controlling a display, comprising the steps of:
generating a plurality of static pixel groups, each static pixel group of the plurality of static pixel groups comprising a plurality individual elements grouped in a predetermined manner similar or identical to other static pixel groups in the plurality of static pixel groups; and
generating a plurality of dynamic pixel groups, at least one dynamic pixel group of the plurality of dynamic pixel groups comprises a plurality of individual elements selected at least from two adjacently situated pixel groups of the plurality of static pixel groups,
wherein each one of the plurality of static pixel groups do not share individual elements from other individual static pixel groups, and
wherein the dynamically-generated dynamic pixel groups are superimposed over the static pixel groups subsequently in a predetermined sequence and manner vertically and/or horizontally, thus enabling an enhanced resolution in a vertical and/or a horizontal direction for a given resolution to be obtained for a given resolution for individual element addressed displays.

22. The method according to claim 21, wherein each static pixel group of the plurality of static pixel groups includes individual elements having one of the colors red, green and blue.

23. The method according to claim 21, wherein each dynamic pixel group of the plurality of dynamic pixel groups includes individual elements having one of the colors red, green and blue.

24. The method according to claim 21, wherein each dynamic pixel group of the plurality of dynamic pixel groups comprises individual elements constituting another dynamic pixel group of the plurality of dynamic pixel groups.

25. The method according to claim 21, at least one static pixel group comprises a first group of a predetermined number of individual elements and at least one dynamic pixel group comprises a second group of the same predetermined number of individual elements, wherein the first and second groups include the same individual elements.

26. The method according to claim 21, further comprising the step of controlling a luminous energy of each individual element.

27. The method according to claim 21, wherein the displaying of video data from a high resolution video source, preferable an HDTV source, can be done in generating different subsets of dynamic, downscaling video data screen layers comprising different dynamic pixel groups which are subsequently displayed and superimposed each other over a time frame on a low resolution display to create an enhanced high resolution screen, preferable an HDTV screen.

28. The method according to claim 21,
wherein the upscaling of video data from a low resolution video source, like a SDTV source can be done in generating different subsets of dynamic video data screen layers comprising different dynamic pixel groups which are subsequently displayed and superimposed each other over a time frame on a low resolution display to create an enhanced high resolution screen, preferable an HDTV screen, and
wherein the data of the additional created dynamic pixels groups in the subsequent screen layers can be computed according to different predetermined Digital Signal Processing and Predicting (DSPP) algorithms, preferably using MPEG video data from the reference frame and target frames, in order to create sharper edges, fine details and better motion control of the original low resolution video source, like a SDTV source.

29. The method according to claim 21, wherein the dynamic high resolution display enhanced mode, preferable in HDTV resolution, can be switched back to the original, low resolution static mode to display computer text, preferable in a progressive scan mode, thus creating a perfect HDTV enabled WebTV set for video and internet access.

30. A display, comprising:
first pixels each including a plurality of dots grouped in a predetermined manner, wherein each group of dots grouped in a predetermined manner is formed similarly or identically; and
second pixels variably and dynamically generated from dots forming the first pixel groups, at least one second pixel includes a plurality of dots selected from at least two adjacently situated first pixels,
wherein each first pixel does not share common dots, and
wherein the dynamically-generated second pixels are superimposed over the first pixels subsequently in a predetermined sequence and manner vertically and/or horizontally, thus enabling an enhanced resolution in a vertical and/or a horizontal direction for a given resolution to be obtained for a given resolution for dot addressed displays.

31. A method for controlling a quad pixels display of a static resolution X/2 ×Y/2, comprising the steps of:
generating a plurality of first pixel groups, each first pixel group of the plurality of first pixel groups comprising 4 dots having one of each colors red, green and blue grouped in a predetermined manner, wherein each group of dots grouped in a predetermined manner is formed similarly or identically;
generating a plurality of second pixel groups, at least one second pixel group of the plurality of second pixel groups includes 4 dots selected from at least two adjacently situated first pixels,
wherein each first pixel does not share common dots,
wherein the total RGB pixel data of a conventional RGB stripe pixels display of a resolution (X−1) ×(Y−1) is distributed into 4 frames of the quad pixels display of a static resolution X /2 ×Y/ 2
wherein P(i,j) represents the RGB stripe pixel at the position of i in the horizontal X axis and j in the vertical Y axis of the conventional RGB stripe display,
wherein QP(i,j) represents the quad pixel of the corresponding quad pixels display at the position of i in the horizontal X axis and j in the vertical Y axis,
wherein MD(i,j) represents the main dot at the upper left quadrant of the quad pixel QP(i,j),
wherein the quad pixels from one of the 4 frames of the quad pixels display are formed using the RGB value of the corresponding RGB stripe pixels of the conventional display $QP(i,j)=P(i,j)$ $i=1$ to $(X-1)$ step 2 $j=1$ to $(Y-1)$ step 2, wherein the quad pixels from one of the 4 frames of the quad pixels display are formed using the RGB value of the corresponding RGB stripe pixels of the conventional display $QP(i,j)=P(i,j)$ $i=2$ to $(X-1)$ step 2 $j=1$ to $(Y-1)$ step 2, wherein the quad pixels from one of the 4 frames of the quad pixels display are formed using the RGB value of the corresponding RGB stripe pixels of the conventional display $$QP(i,j)=P(i,j)\ i=1\ \text{to}\ (X-1)\ \text{step}\ 2\ j=2\ \text{to}\ (Y-1)\text{step}\ 2,$$

wherein the quad pixels from one of the 4 frames of the quad pixels display are formed using the RGB value of the corresponding RGB stripe pixels of the conventional display $$QP(i,j)=P(i,j)\ i=2\ \text{to}\ (X-1)\ \text{step}\ 2\ j=1\ \text{to}\ (Y-1)\text{step}\ 2.$$

32. The method according to claim 31, wherein a weighted dot rendering method is used for each frame of the 4 frames of the quad pixels display to leverage the energy at the main dot MD(i,j) of a quad pixel QP(i,j) by multiplying a same value between 25% to 85% to the value of MID(i,j) of each of the 4 frames while the weight attributed to each of the rest 3 dots in the quad pixel is equal to [100% −(the weight value chosen for MD(i,j))] divided by 3.

33. The method according to claim 31, wherein a viewing perception of a high resolution (X−1) ×(Y−1) image at the quad pixels display of a low static resolution X/2 ×Y/2 can be obtained by adding all the weighted value of each dot from the 4 frames of the quad pixel display all together to be presented on the quad pixels display in the form of red, green, and blue light intensity.

34. The method according to claim 31, wherein the weight attributed to the main dots MD(i,j) in each of the 4 frames can be set with different values between 25% and 85% in order to re-calibrate the white balance of the quad pixels display after a color shifting due to the different decreases of light intensity of each primary color over the time.

* * * * *